United States Patent
Sahgal et al.

(10) Patent No.: US 12,175,068 B2
(45) Date of Patent: *Dec. 24, 2024

(54) ELECTRONIC SIGNATURES OVER AN ONLINE SHARING SESSION

(71) Applicant: Tekion Corp, San Ramon, CA (US)

(72) Inventors: Abhinandan Sahgal, Bengaluru (IN); Justin Alexander Chi-Young Hou, Pleasanton, CA (US); Gaurav Gupta, Chandigarh (IN)

(73) Assignee: Tekion Corp, Pleasanton, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 17/231,376

(22) Filed: Apr. 15, 2021

(65) Prior Publication Data

US 2021/0326482 A1    Oct. 21, 2021

Related U.S. Application Data

(60) Provisional application No. 63/010,657, filed on Apr. 15, 2020.

(51) Int. Cl.
*G06F 16/93* (2019.01)
*B60R 25/102* (2013.01)
(Continued)

(52) U.S. Cl.
CPC ........ *G06F 3/04883* (2013.01); *B60R 25/102* (2013.01); *B60R 25/24* (2013.01); *B60R 25/305* (2013.01); *G06F 16/176* (2019.01); *G06F 16/9035* (2019.01); *G06F 16/93* (2019.01); *G06F 21/64* (2013.01); *G06F 40/106* (2020.01);
(Continued)

(58) Field of Classification Search
CPC .............. G06F 3/04883; G06F 16/176; G06F 16/9035; G06F 16/93; G06F 21/64; G06F 40/106; G06F 40/169; G06F 40/186; G06F 40/197; B60R 25/102; B60R 25/24; B60R 25/305; G07C 9/00309; G07C 9/00571; G07C 2009/00373; G07C 2009/00769; G07C 2209/08; G07C 2209/63;
(Continued)

(56) References Cited

U.S. PATENT DOCUMENTS 6,091,835 A    7/2000  Smithies et al.
8,209,762 B2 * 6/2012  Hong ................. H04N 1/00846
                                                    726/31

(Continued)

OTHER PUBLICATIONS

International Search Report and Written Opinion, Patent Cooperation Treaty Application No. PCT/US2021/027530, Jul. 14, 2021, 14 pages.

(Continued)

*Primary Examiner* — Carl G Colin
*Assistant Examiner* — Andrew Suh
(74) *Attorney, Agent, or Firm* — Fenwick & West LLP

(57) ABSTRACT

A document management system manages documents. The documents are managed such that the documents may be shared with one or more users during an online sharing session for electronic signing. During the online sharing session, one or more documents are collaboratively reviewed by one or more participants of the online sharing session. The one or more documents are e-signed at least one of the participants of the online sharing session.

15 Claims, 19 Drawing Sheets

(51) Int. Cl.
  *B60R 25/24* (2013.01)
  *B60R 25/30* (2013.01)
  *G06F 3/04883* (2022.01)
  *G06F 16/176* (2019.01)
  *G06F 16/9035* (2019.01)
  *G06F 21/64* (2013.01)
  *G06F 40/106* (2020.01)
  *G06F 40/169* (2020.01)
  *G06F 40/186* (2020.01)
  *G06F 40/197* (2020.01)
  *G07C 9/00* (2020.01)
  *H04L 65/1069* (2022.01)
  *H04L 65/401* (2022.01)
  *H04L 67/53* (2022.01)
  *H04W 4/021* (2018.01)

(52) U.S. Cl.
  CPC .......... *G06F 40/169* (2020.01); *G06F 40/186* (2020.01); *G06F 40/197* (2020.01); *G07C 9/00309* (2013.01); *G07C 9/00571* (2013.01); *H04L 65/1069* (2013.01); *H04L 65/4015* (2013.01); *H04L 67/53* (2022.05); *H04W 4/022* (2013.01); *G07C 2009/00373* (2013.01); *G07C 2009/00769* (2013.01); *G07C 2209/08* (2013.01); *G07C 2209/63* (2013.01)

(58) Field of Classification Search
  CPC . H04L 65/1069; H04L 65/4015; H04L 67/53; H04W 4/022
  See application file for complete search history.

(56) References Cited

U.S. PATENT DOCUMENTS

| | | | |
|---|---|---|---|
| 10,685,136 B1* | 6/2020 | Hecht | G06F 21/6245 |
| 2003/0033295 A1 | 2/2003 | Adler | |
| 2003/0101271 A1 | 5/2003 | Smith et al. | |
| 2005/0157334 A1 | 7/2005 | Silverbrook et al. | |
| 2008/0072334 A1 | 3/2008 | Bailey et al. | |
| 2009/0084610 A1 | 4/2009 | Silverbrook et al. | |
| 2012/0140280 A1* | 6/2012 | Lapstun | H04N 1/00326 358/1.15 |
| 2016/0335415 A1* | 11/2016 | Jones | G16H 80/00 |
| 2017/0017646 A1* | 1/2017 | Kumar | G06F 21/00 |
| 2017/0161375 A1 | 6/2017 | Stoica et al. | |
| 2018/0113845 A1* | 4/2018 | Aggarwal | H04L 65/403 |
| 2019/0180240 A1 | 6/2019 | O'Brien | |
| 2019/0272141 A1 | 9/2019 | Poel et al. | |
| 2020/0042688 A1* | 2/2020 | Schwartz | G10L 17/00 |
| 2020/0067997 A1* | 2/2020 | Hardee | G06F 40/166 |
| 2020/0145226 A1* | 5/2020 | Haddad | G06F 40/186 |
| 2020/0151630 A1* | 5/2020 | Shakhnovich | G06Q 10/063 |
| 2022/0335673 A1* | 10/2022 | Jang | G06T 11/00 |
| 2022/0365981 A1* | 11/2022 | Du | G06F 16/355 |

OTHER PUBLICATIONS

Extended European Search Report, European Patent Office Application No. 21788178.8, dated May 15, 2024, 6 pages.

\* cited by examiner

| Document | | | | |
|---|---|---|---|---|
| Required Data | | Data Summary 1<br>Condition 1 | Data Summary 2<br>Condition 2 | Data Summary 3<br>Condition 3 |
| Required Data Field 1 | Data Value | Data Value | Data Value | Data Value |
| Required Data Field 2 | Data Value | Data Value | Data Value | Data Value |
| Required Data Field 3 | Data Value | Data Value | Data Value | Data Value |
| Supplemental Data 1 | | | | |
| Supplemental Data Field 1 | | Data Value | Data Value | Data Value |
| Supplemental Data Field 2 | | Data Value | Data Value | Data Value |
| Supplemental Data Field 3 | | Data Value | Data Value | Data Value |
| Supplemental Data 2 | | | | |
| Supplemental Data Field 4 | | Data Value | Data Value | Data Value |
| Supplemental Data Field 5 | | Data Value | Data Value | Data Value |
| Supplemental Data Field 6 | | Data Value | Data Value | Data Value |

FIG. 3

| Group/Field Name | Hide/Show |
|---|---|
| Required Data | ⬤ |
| Supplemental Data 1 | ◯ |
| Supplemental Data 2 | ◯ |
| Supplemental Data Field 1 | ⬤ |
| Supplemental Data Field 2 | ◯ |
| Supplemental Data Field 3 | ◯ |

Preview

| | Data Summary 1 Condition 1 | Data Summary 2 Condition 2 | Data Summary 3 Condition 3 |
|---|---|---|---|
| Required Data Field 1 Data Value | Data Value | Data Value | Data Value |
| Required Data Field 2 Data Value | Data Value | Data Value | Data Value |
| Required Data Field 3 Data Value | Data Value | Data Value | Data Value |
| Supplemental Data Field 1 | Data Value | Data Value | Data Value |

SHARE

FIG. 4A

| Group/Field Name | Hide/Show |
|---|---|
| Required Data | ● |
| Supplemental Data 1 | ○ |
| Supplemental Data 2 | ○ |
| Supplemental Data Field 1 | ○ |
| Supplemental Data Field 2 | ○ |
| Supplemental Data Field 3 | ○ |

401

Preview 407

| | Data Summary 1 Condition 1 | Data Summary 2 Condition 2 | Data Summary 3 Condition 3 |
|---|---|---|---|
| Required Data Field 1 Data Value | Data Value | Data Value | Data Value |
| Required Data Field 2 Data Value | Data Value | Data Value | Data Value |
| Required Data Field 3 Data Value | Data Value | Data Value | Data Value |

403

SHARE 409

Pending 3 Signed 0

◯ Live Session

Document List

| Name | Date Shared | Date Signed | Sign Completed |
|---|---|---|---|
| ☑ Document 1 | 3-8-2021 | — | — |
| ☐ Document 2 | 3-8-2021 | — | — |
| ☐ Document 3 | 3-8-2021 | — | — |

701 — Start Signing

FIG. 7A

| Pending 2 Signed 1 | | | | |
|---|---|---|---|---|
| Document List | | | | |
| Name | Date Shared | Date Signed | Sign Completed | |
| ☑ Document 1 | 3-8-2021 | 3-8-2021 | ☑ | Signed |
| ☐ Document 2 | 3-8-2021 | | | |
| ☐ Document 3 | 3-8-2021 | | | |

Start Signing

FIG. 7E

ELECTRONIC SIGNATURES OVER AN ONLINE SHARING SESSION

CROSS-REFERENCE TO RELATED APPLICATION

This application claims priority to U.S. Provisional Application No. 63/010,657 filed on Apr. 15, 2020, which is incorporated by reference in its entirety.

BACKGROUND

Field of Disclosure

The present disclosure generally relates to a document management system, and more specifically to e-signing of documents during online sharing sessions.

Description of the Related Art

Document signing tools allow e-signing (e.g., electronic signing) of electronic documents using an electronic signature. E-signing is an alternative to handwritten signatures (wet signatures) in any process that requires a signature to approve a document. However, conventional document signing tools require that the electronic document being e-signed be finalized before being e-signed. Thus, if during a document signing session it is determined that the electronic document needs revision before being e-signed, the entity that generated the electronic document must revise the electronic document and re-upload the revised electronic document for e-signing. Thus, conventional document signing tools are cumbersome.

SUMMARY

A document management system is configured to manage one or more documents that include content. A set of documents stored in the document management system may be shared with one or more participants during an online sharing session. During the online sharing session, the documents themselves are shared with the participants of the online sharing session rather than merely an image of a display screen of one of the participants. In one embodiment, the documents in the set must be electronically signed during the online sharing session. The documents are electronically signed by one or more participants of the online sharing session.

In one embodiment, the set of documents shared during the online sharing session are associated with another document executed by the one or more participants. The documents included in the set of documents are determined based on the other document. The set of documents may also exclude any documents that require a handwritten signature by the one or more participants of the online sharing session.

BRIEF DESCRIPTION OF DRAWINGS

FIG. 3 is an example document according to one embodiment.

FIGS. 4A and 4B illustrate example filters for filtering portions of the document for sharing according to one embodiment.

FIGS. 5A to 5C are examples of an online sharing session including a shared version of the document, according to one embodiment.

FIGS. 7A to 7E illustrate the online sharing session for e-signing documents in the document set, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Document Management System Environment

Figure 1:
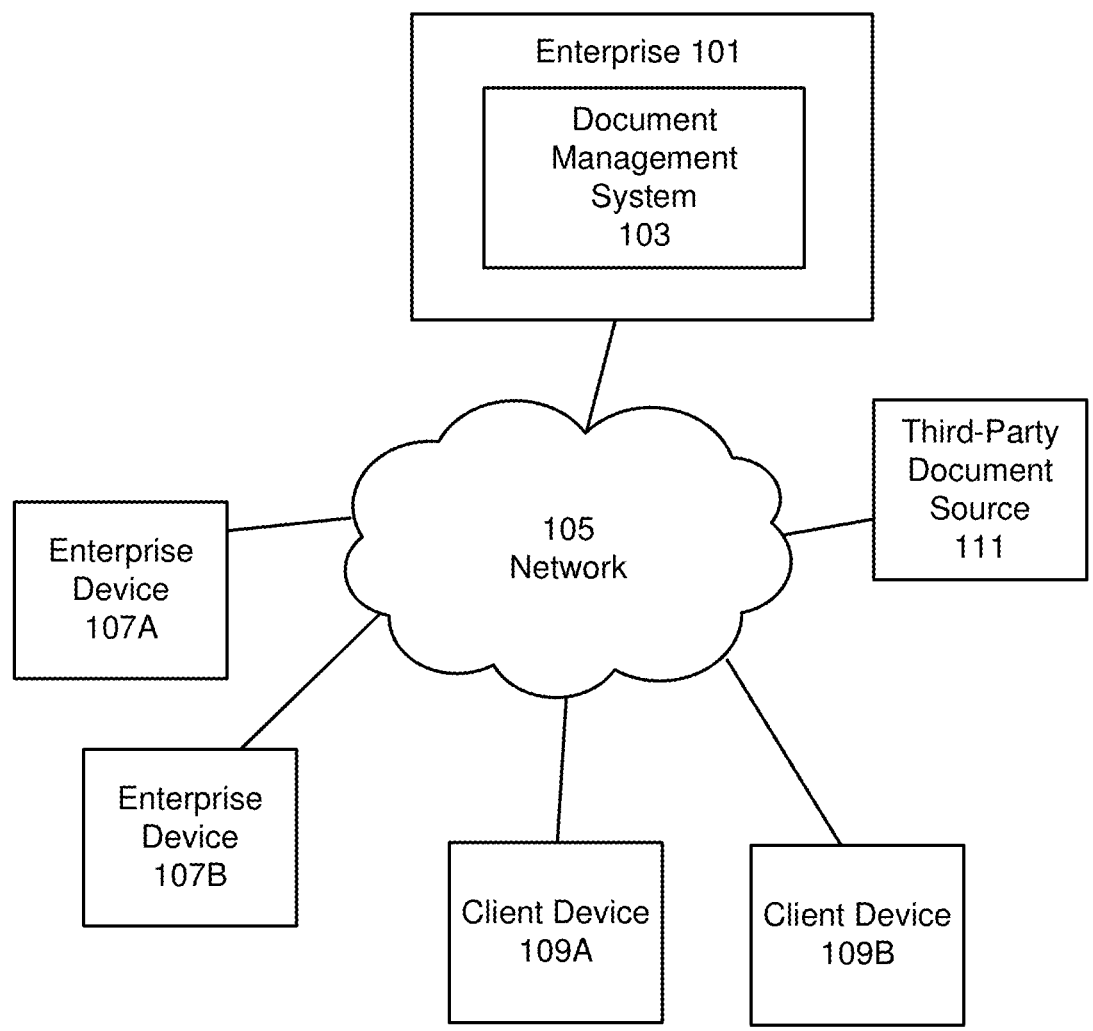
FIG. 1 is a high-level block diagram illustrating an embodiment of an environment for sharing documents for e-signing according to one embodiment.

FIG. 1 is a high-level block diagram illustrating an embodiment of an environment 100 of a document management system 103 for e-signing (electronically signing or executing) documents of an enterprise 101. An example of an enterprise 101 included in the environment is an automobile dealership. However, the enterprise 101 can be any type of entity that requires document signing during online sharing sessions with one or more participants. The documents managed by the document management system 103 may include any type of data related to the enterprise 101 such as a deal sheet.

Figure 10:
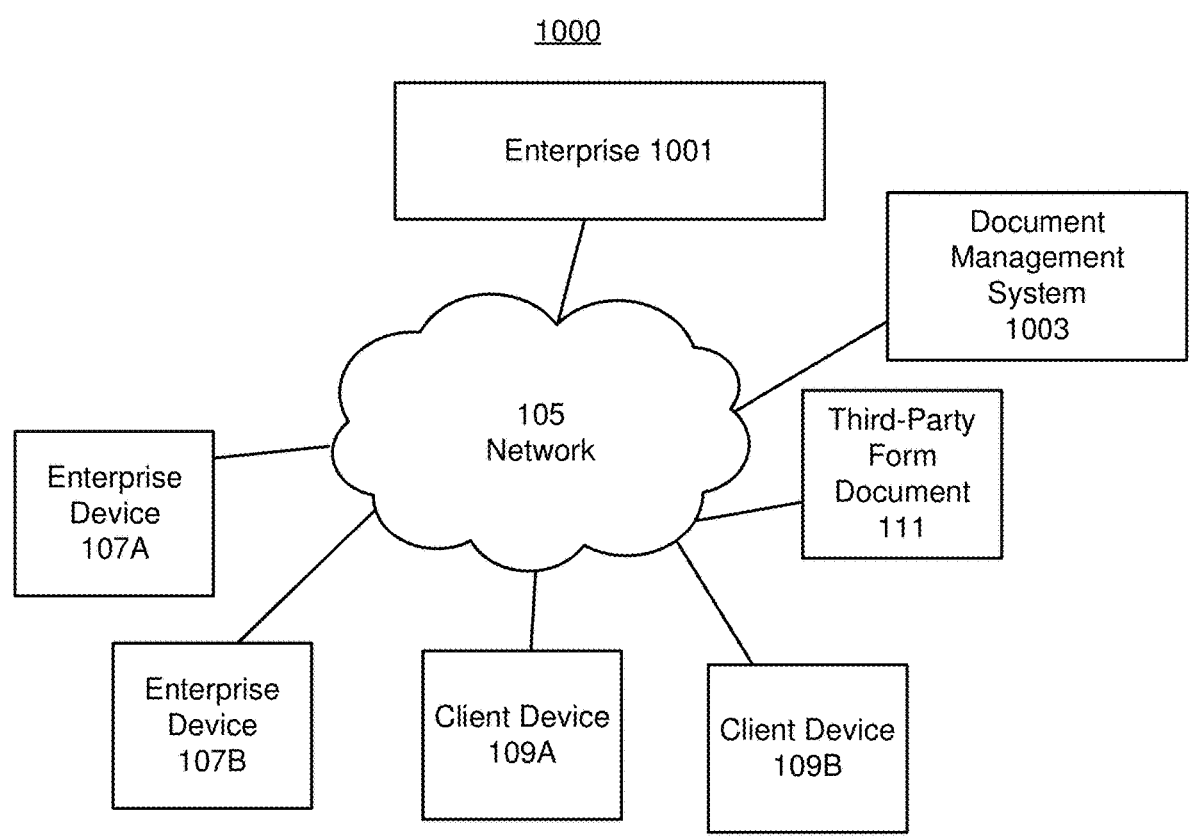
FIG. 10 is a high-level block diagram illustrating another embodiment of an environment for sharing documents for e-signing according to one embodiment

In one embodiment, the environment 100 includes the enterprise 101, a plurality of enterprise devices 107A to 107B, a plurality of client devices 109A to 109B, and a third-party document source 111 connected to each other via a network 105. As shown in FIG. 1, the enterprise 101 includes a document management system 103. Note that in another embodiment such as shown in FIG. 10, the document management system 103 may be separate from the enterprise 101 as will be further described below with respect to FIG. 10. Any number of document management systems, enterprises, enterprise devices, third-party document sources and client devices may be present in other embodiments.

The network 105 provides a communication infrastructure between the entities included in environment 100. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network.

Enterprise devices 107 and client devices 109 may include any type of device having an application that communicates with the document management system 103 of the enterprise 101. For example, an enterprise device 107 and/or a client device 109 may be a mobile device or personal computer or any other type of device.

Generally, enterprise devices 107 represent devices of the enterprise 101. Representatives of the enterprise 101 use enterprise devices 107 to access documents stored by the document management system 103. Accessing documents may include generating new documents and sharing the newly generated documents with other representatives of the enterprise 101 and/or with customers of the enterprise 101. Accessing documents may further include viewing existing entries in a document, adding new entries to the documents, modifying existing entries in the documents, and/or delete existing entries in the document.

In contrast, a client device 109 represents devices of non-representatives of the enterprise 101. An example of a non-representative of the enterprise 101 is a client of the enterprise 101. Although the embodiments herein describe sharing of documents between representatives of the enterprise 101 and non-representatives of the enterprise 101 for e-signing, the embodiments may be applied to any types of entities that require document execution.

In one embodiment, the enterprise device 107 and client device 109 may each include an application that allows interaction with the document management system 103 to share and execute documents stored by the document management system 103. The application may be a dedicated application specifically designed by the organization associated with the document management system 103. The application allows for interaction with the document management system 103.

In one embodiment, the third-party document source 111 stores documents created by the third-party document source 111. The documents created by the third-party document source 111 are retrieved by the enterprise 101 for execution by users of client devices 109 and/or enterprise devices 107. In one embodiment, the third-party document source 111 is managed by a different entity than the enterprise 101. The environment 100 may include multiple third-party document sources rather than one third-party document source 111. An example third-party document source is the DMV. The DMV may provide forms required to register an article acquired from the enterprise 111, lien documents, and/or title documents. Another example of a document created by the third-party document source 111 is a LAW 553 document. However, any document generation entity may be a third-party document source 111.

The document management system 103 is configured to manage one or more documents that store data of the enterprise 101. Enterprise representatives use enterprise devices 107 to generate documents using stored data and share the documents with client devices 109 of non-representatives during online sharing sessions created by the document management system 103. As will be further described below, shared documents may be e-signed by one or more users during an online sharing session.

Document Management System

Figure 2:
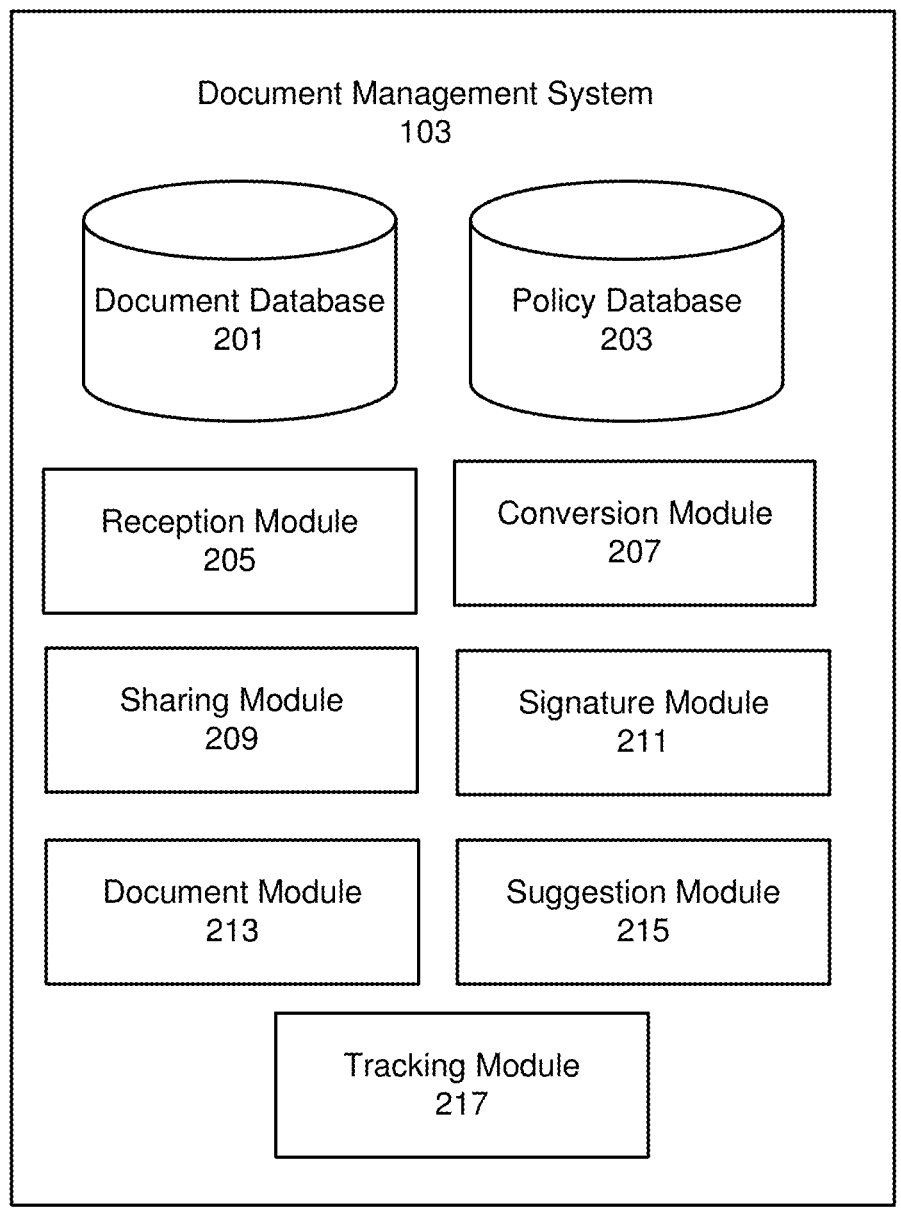
FIG. 2 is a high-level block diagram illustrating a detailed view of a document management system, according to one embodiment.

FIG. 2 is a high-level block diagram illustrating a detailed view of the document management system 103 of FIG. 1. In one embodiment, the document management system 103 includes a document database 201, a policy database 203, a reception module 205, a conversion module 207, a sharing module 209, a signature module 211, a document module 213, a suggestion module 215, and a tracking module 217. Note that in other embodiments, the document management system 103 may include other modules and/or databases than those illustrated in FIG. 2.

The document database 201 is configured to store one or more documents. In one embodiment, documents are classified as either primary documents or secondary documents. In one embodiment, primary documents may be documents created by the enterprise 101 from document templates of the enterprise 101. For example, the primary document may be a summary sheet of an automotive acquisition that is generated from a document template. In contrast, secondary documents are documents (e.g., forms) that are associated with one or more primary documents. Secondary documents may be documents (e.g., forms) generated by the enterprise 101. Secondary documents may also be third-party documents (e.g., forms) received from the third-party document source 111.

In one embodiment, a document (primary or secondary) includes content such as a plurality of fields and a corresponding value for each field that collectively form the document. The fields of data and their corresponding values may be arranged in a series of rows and columns. However, other organization formats can be used for documents. FIG. 3 is an example primary document 300 stored in the document database 201 according to one embodiment. As shown in FIG. 3, the primary document includes a plurality of fields of data 301 and their corresponding values 303 arranged in a series of rows and columns. In other embodiments, documents lack information fields and values for the fields, but rather include alphanumeric text.

In one embodiment, the document database 201 may also store one or more document templates used to generate new primary documents. Each document template may be associated with a particular type of primary document and includes required fields of data for the document template. The values for the fields of data included in each document template are blank.

In one embodiment, one or more document templates stored in the document database 201 are associated with a set of secondary documents (e.g., forms) that require e-signing. The policy database 203 may store policies for stored documents. The policies may include an inclusion policy and an exclusion policy for one or more of the document templates stored in the document database 201. In one embodiment, the inclusion policy for a document template describes a set of secondary documents to include in online sharing sessions for e-signing along with the primary document created from the document template. In one embodiment, some secondary documents stored in the document database 201 require a wet signature (handwritten signature) rather than an electronic signature, so those secondary documents are excluded from being shared during online sharing sessions. Thus, the policies may also include an exclusion policy for the document template that describes secondary documents to exclude from online sharing sessions for e-signing.

The secondary documents that may be e-signed and the secondary documents requiring hand signature may vary by geographic location. For example, each state may require particular secondary documents to be hand signed while allowing other secondary documents to be electronically signed. Accordingly, the policy database 203 may include state specific exclusion policies where each state specific exclusion policy includes a list of state specific secondary documents for exclusion from sharing during online sharing sessions. In contrast, state specific inclusion policies each include a list of state specific secondary documents for inclusion during online sharing sessions for e-signing during online sharing sessions.

In one embodiment, the exclusion policies and inclusion policies may be based on attributes of secondary documents. Generally, the stored secondary documents may each be associated with a printer attribute that defines the type(s) of printer required to print the secondary document. The type of printer used to print a secondary document is a heuristic that indicates whether to include or exclude the secondary document from sharing during an online sharing session for e-signing. For example, a secondary document that requires a dot matrix printer (e.g., a type of printer) to print the secondary document should be excluded for sharing during an online sharing session as secondary documents printed by a dot matrix printer typically require a handwritten signature. Thus, an exclusion policy may list one or more types of printers where secondary documents that are printed by the type of printers defined in the exclusion policy are excluded from being shared during the online sharing session. Conversely, an inclusion policy may list one or more types of printers where secondary documents that are printed by the type of printers in the inclusion policy are allowed to be shared during the online sharing session for e-signing.

In one embodiment, the inclusion policies and exclusion policies described above are automatically created by the document management system 103. However, in other embodiments the inclusion policies and exclusion polices are manually curated. The document management system 103 receives an exclusion policy from a representative of the enterprise 101 that defines a list of secondary documents to exclude from online sharing sessions as the documents in the list require handwritten signatures. Similarly, the document management system 103 receives an inclusion policy from a representative of the enterprise that defines a list of secondary documents that are allowed to be shared during an online sharing session for e-signing. The factors described above individually or in combination may be used to generate inclusion policies and exclusion policies.

In one embodiment, the reception module 205 receives requests to generate new primary documents. A request to generate a new primary document may specify the type of primary document to be generated. In one embodiment, the reception module 205 receives a request to generate a new primary document from an enterprise device 107. However, in other embodiment the requests may be received from either the enterprise device or client device 109.

In response to receiving the request, the reception module 205 retrieves a document template associated with the type of document specified in the request from the document database 201 and transmits the retrieved document template to the device of the user that transmitted the request. The reception module 205 determines values for the fields of data included in the document template. In one embodiment, the reception module 205 receives values for one or more fields of data of the document template from the device of the user that requested to generate the document (e.g., a representative of the enterprise 101) and inserts the values into the document template.

In one embodiment, the reception module 205 automatically inserts values into the document template. One or more fields of data may indicate a location in another document stored in the document management system from which to retrieve the values for the document template. The reception module 205 automatically retrieves the values from another document(s) as indicated in the one or more fields of the document template. The retrieved values are automatically added to the appropriate fields in the document template by the reception module 205.

Once the fields of data included in the document template are completed, the reception module 205 receives a request to store the document as a new primary document in the document database 201 from the device of the user (e.g., the representative). In one embodiment, the reception module 205 stores the primary document in the document database 201 using an editing format (e.g., a file format). In one embodiment, the editing format may not be conducive for sharing with others, but is beneficial for editing purposes. For example, the editing format may be a spreadsheet format for example.

In one embodiment, documents stored in the document database 201 may be shared between devices of multiple users in an online sharing session. By sharing the document during the online sharing session, the amount of time that the participants of the online sharing session need to physically interact in-person with each other is reduced, if not eliminated completely. In one embodiment, the reception module 205 may receive a request from a device of a user to share a primary document generated from a document template. The request may be received in response to a selection of a user interface element included in primary document for sharing the document. For example, FIG. 3 includes a sharing user interface element 305 that indicates to the document management system 103 a request to share the primary document 300 responsive to user selection of the sharing user interface element 103.

As mentioned above, the format of documents stored in the document database 201 is not ideal for sharing during an online sharing session. Responsive to the request to share a primary document, the conversion module 207 converts the primary document into a format for sharing during an online session. To perform the conversion, the conversion module 207 receives from the user that transmitted the request sharing criteria which is indicative of portions of the primary document to share during the online sharing session and portions of the primary document to exclude from sharing during the online sharing session. That is, the user may decide to share the primary document in its entirety or share a subset of the primary document during the online session. For example, the user may filter the fields of information of the primary document that are shown to another user during the online session, so that the other user is only provided with the most relevant information of the primary document during the online sharing session.

In one embodiment, the conversion module 207 transmits a filtering tool 400 to the device of the user that requested to share the primary document, as shown in FIG. 4A. The filtering tool 400 includes a list of filtering criteria 401. The filtering criteria specifies portions of the content included in the primary document to include in the shared primary document as well as portions of the content included in the primary document to exclude from the shared primary document. For example, in FIG. 4A the filtering criteria 401 includes a list of names of fields of information included in the document that may be either included or removed (e.g., filtered) from the primary document for sharing during the online session.

In one embodiment, the primary document may be filtered based on groups of fields of information or individual fields of information. Groups of fields of information include multiple fields of information in the primary document whereas an individual field of information includes only a single field of information in the primary document. One example of a group of fields of information is the "Required Data" group 405 and one example of an individual field of information is the "Supplemental Data Field 1" 407 as shown in the filter 401. Referring back to FIG. 3, the "Required Data" group includes a plurality of fields of information in the group whereas the "Supplemental Data Field 1" is a single information field included under the group "Supplemental Data 1."

Referring back to FIG. 4A, each group of fields of information and individual field of information includes a mechanism 407 for filtering the respective group or individual field of information. The mechanism 407 is used to indicate whether to enable (e.g., show)) or disable (e.g., hide) the group or individual field of information that is associated with the mechanism in the primary document during the online sharing session. Thus, the user may decide which information to include in the primary document during the online sharing session.

In one embodiment, the conversion module 207 renders a preview 403 of the primary document for sharing during the online sharing session. The preview is transmitted to the device of the user and visually indicates the appearance and the content of the primary document that will be shared during the online sharing session. By providing the user with the preview, the user may decide to edit the fields of information that are included in the primary document prior to sharing the primary document by enabling or displaying content to include in the shared document.

In one embodiment, the rendered preview includes the selected content of the primary document using the filtering tool 400 and allows the user to verify the content of the primary document to be shared during the online session. In one embodiment, the conversion module 207 generates the preview of the primary document in a preview format (e.g., file format) that is different from the editing format of the primary document. The preview format is a format that can be used to quickly render the primary document based on the selected filtering criteria. For example, the preview format may be a markup language format such as HTML. However, other preview formats may be used for generating the preview of the primary document.

In FIG. 4A, the preview 403 of the primary document includes the group of fields of information "Required Data" as well as the individual field of information "Supplemental Data Field 1" as a result of the enabled fields included in the filtering criteria 401. In contrast, in FIG. 4B, the preview 403 of the primary document is updated to include only the group of fields of information "Required Data" as the user may decide not to include the individual field of information "Supplemental Data Field 1".

The conversion module 207 may receive a request from the device of the user to share the primary document shown in the preview with another user during an online sharing session upon approval of the primary document. The request may be received from the conversion module 207 responsive to the user selecting the "share" user interface element 409 as shown in FIGS. 4A and 4B, for example.

In one embodiment, the request may include a plurality of request attributes. The request attributes include one or more identifiers of one or participants requested to participate in the online sharing session of the primary document. An identifier of a participant may include an email address of the participant, for example. The request attributes may also include a date and time for the online sharing session.

The conversion module 207 generates the primary document for sharing based on the preview. The version of the primary document for sharing may be stored in the document database 201 for use during the online sharing session. In one embodiment, the conversion module 207 may generate the primary document for sharing responsive to the sharing request. Alternatively, the conversion module 207 may wait to generate the primary document for sharing until the date and time of the online sharing session.

To generate the primary document for sharing, the conversion module 207 may convert the preview of the primary document that is in the preview format (e.g., HTML) into a sharing format. In one embodiment, the sharing format is a file format that is used to display documents in electronic form independent of the software, hardware, or operating system that is used to display the document. For example, the conversion module 207 may convert the preview of the primary document into a portable document format (PDF). However, other sharing formats may be used.

In one embodiment, the sharing module 209 shares a primary document that is in the sharing format with multiple participants during a scheduled online sharing session. The sharing module 209 may transmit an invitation for the online sharing session to devices of the participants identified in the request attributes. Only participants who have the link will be authorized access to the online sharing session. The invitation may optionally include authentication information (e.g., a password) required to access the online sharing session. The participants of the online sharing session may include one or more representatives of the enterprise 101 and/or one or more non-representatives, for example. At the date and time of the online sharing session, the participants select the link using their devices which directs a web browser on the devices of the participants to the online sharing session.

Figure 5A:
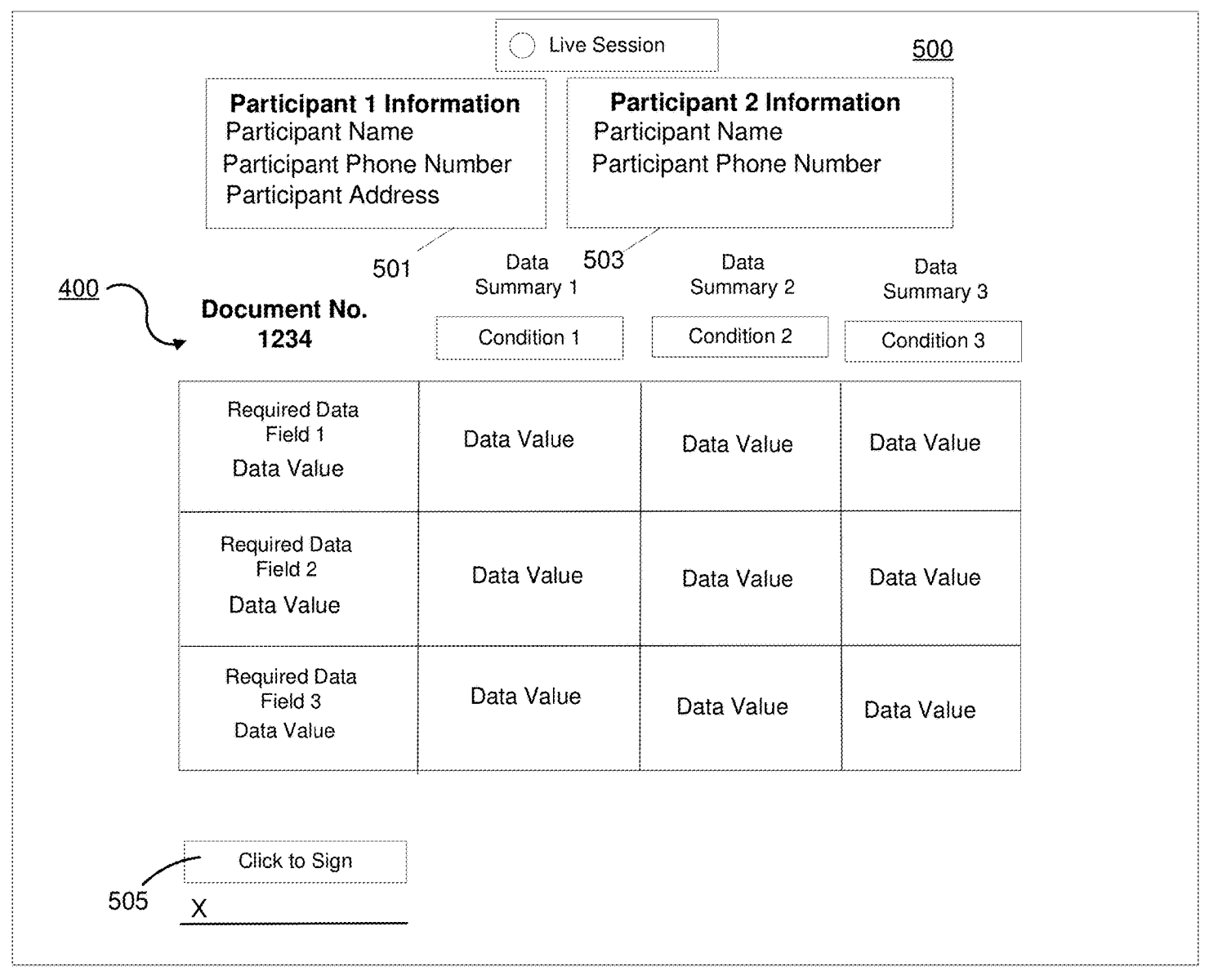

During the online sharing session, the sharing module 209 shares the primary document stored in the sharing format. That is, the actual document is shared during the online session rather than merely an image of the content displayed on a display screen of one of the participant's device. FIG. 5A illustrates one example of an online sharing session 500. As shown in FIG. 5A, the online sharing session 500 includes the shared primary document 400 that is in the sharing format shown in FIG. 4B as well as participant information 501 and 503. The participant information may include attributes of each participant such as their name, phone number, address, etc. However, any other type of information may be included in the participant information.

During the online sharing session, the participants may review the primary document in a collaborative environment. If one of the participants requests to view more information in the primary document as a result of the discussion, the conversion module 207 may receive edited filtering criteria from the device of a participant (e.g., a representative) to generate an edited version of the primary document that includes additional information, and share the edited primary document during the online sharing session. If the existing content (e.g., values of the fields of information) of the shared document requires editing (e.g., addition, deletion, or modification), the reception module 205 may receive edits to values of the document stored in the editing format from the device of the participant (e.g., a representative). The conversion module 207 converts the edited document into the sharing format and the sharing module 209 may re-share the edited primary document during the online sharing session according to the process previously described above.

In one embodiment, the primary document may require an electronic signature from one or more of the participants of the online sharing session. In the automobile acquisition example, the acquiring user electronically signs the primary document. Another participant (e.g., a co-acquirer and/or representative) may also electronically sign the primary document. The electronic signature is a legal way to obtain consent or approval of the primary document from one or more participants of the online sharing session. The signature module 211 may receive a request from a device of a participant of the online sharing session to add an electronic signature to the primary document. For example, the signature module 211 receives a request from a client device 109 of a non-representative of the enterprise 101 responsive to the non-representative selecting the "click to sign" user interface element 505 included in the online sharing session 500.

Figure 5B:
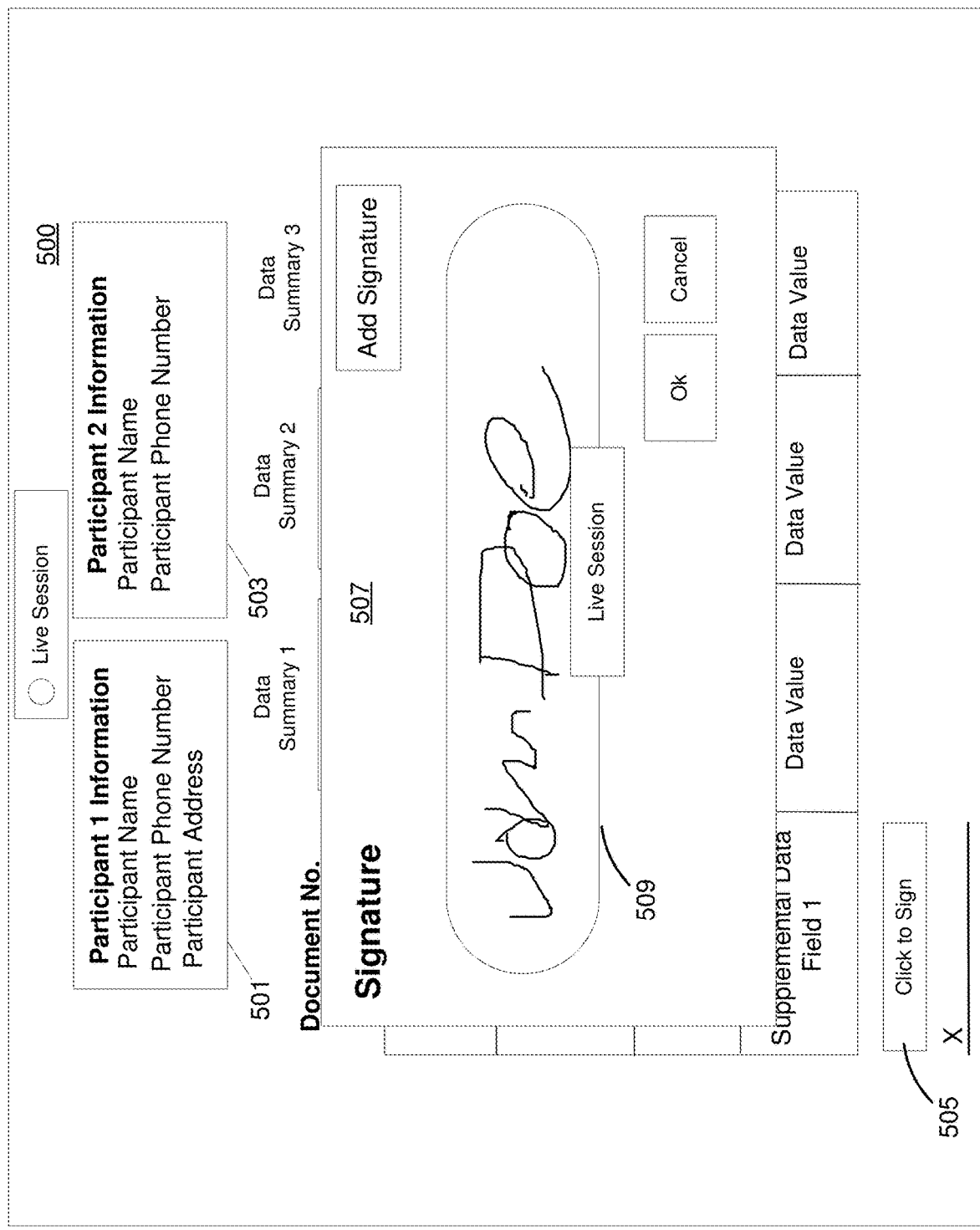
Figure 5C:
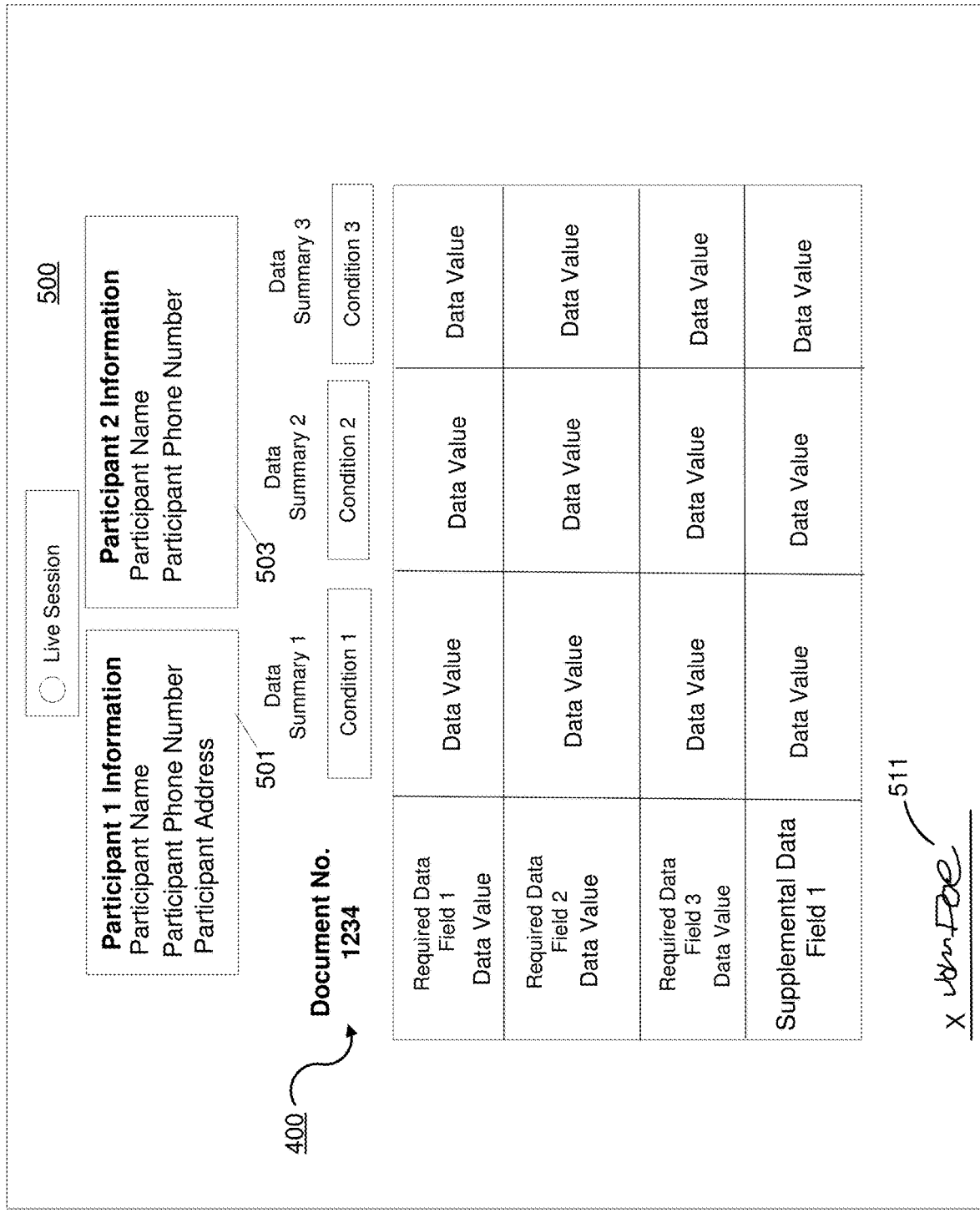

Responsive to the request to add the electronic signature to the primary document, the signature module 211 transmits an electronic signature tool to the device of the participant that submitted the request. FIG. 5B is one example of the electronic signature tool 507. The electronic signature tool 507 includes a signature location 509 where the participant adds his or her electronic signature. In one embodiment, the signature module 211 receives an electronic signature drawn by the participant in the signature location 509. Alternatively, the signature module 211 transmits different electronic signatures to the participant to select from. The selected signature is added to the document. For example, FIG. 5C illustrates the electronic signature 511 added to the primary document 400.

In one embodiment, the suggestion module 215 generates suggestions for a participant (e.g., the non-representative) during the online sharing session. In one embodiment, the primary document shared during an online sharing session is associated with an article. The suggestion provided during the online sharing session describes another article of the enterprise 101, for example.

In one embodiment, the suggestion module 215 is a machine-learned neural network model. Any machine learning algorithm may be used by the machine-learned neural network models such as linear regression, logistic regression, SVM, etc. The suggestion module 215 is trained to automatically generate suggestions for an online sharing session based on attributes of the online sharing session. The attributes may be participant attributes of a participant of the online sharing session (e.g., the non-representative) and attributes of the shared document(s). The document attributes include the values of the fields of information included in the document.

In one embodiment, the tracking module 217 tracks a status associated with the article described in the primary document. The status may be a location status, for example. The tracking module 217 may transmit notifications to the device of the participant (e.g., the non-representative) that describe the location status of the article. In one embodiment, a tracking device is positioned on a delivery mechanism of the article that periodically transmits geographical location information to the tracking module 217. The tracking module 217 generates the notifications based on the received geographical location information. The notifications may be transmitted to the device of participant automatically or upon request from the device of the participant.

Secondary Document Sets

As mentioned above, a primary document may be associated with a set of secondary documents (e.g., forms) for e-signing. In one embodiment the document module 213 determines the set of secondary documents for e-signing where the secondary documents are associated with a particular primary document. The document module 213 determines the set of secondary documents for e-signing based on the one or more policies (e.g., inclusion and exclusion policies) associated with the document template used to create the primary document. The set of secondary documents includes both the secondary documents eligible for e-signing as well as secondary documents that are ineligible for e-signing. In one embodiment, the document module 213 determines the set of secondary documents responsive to the primary document being e-signed. In other embodiments, the document module 213 determines the set of secondary documents after creation of the primary document.

In one embodiment, the reception module 205 determines values for any fields of data included in one or more secondary documents. The reception module 205 receives values for one or more fields of data from a device of a user such as from the enterprise device 107 of a representative of the enterprise 101. In one embodiment, the reception module 205 automatically inserts values into the fields of data for one or more secondary documents in the set. One or more fields of data in each secondary document may indicate a location in another document stored in the document management system 103 from which to retrieve the values for the secondary document. The reception module 205 automatically retrieves the values from another document(s) as indicated in the one or more fields of the secondary document. The retrieved values are automatically added to the appropriate fields in the secondary document by the reception module 205.

In one embodiment, the document module 213 provides a user interface including the set of secondary documents to an enterprise device 107 of a representative of the enterprise 101. The representative verifies the accuracy of the secondary documents in set before the set of secondary documents are shared for e-signing during an online sharing session. For example, FIG. 6A illustrates a user interface 600 including a list of the set of secondary documents 601 associated with primary document 300.

Figure 6A:
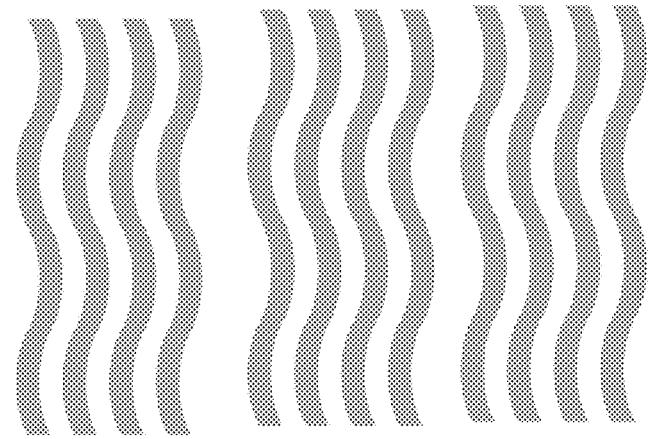
FIGS. 6A to 6B illustrate a document set including documents for e-signing, according to one embodiment.

As shown in FIG. 6A, the list of the set of secondary documents are arranged in a series of rows where each row is associated with one of the secondary documents in the set. Each secondary document is selectable such that selection of the secondary document causes the document module 213 to transmit a preview of the selected secondary document to the representative device 107. By displaying the preview of the secondary document, the representative verifies the accuracy of information included in the secondary document. As shown in FIG. 6A, a preview of secondary "Document 1" is shown in the preview area 603 of the user interface 600.

Figure 6B:
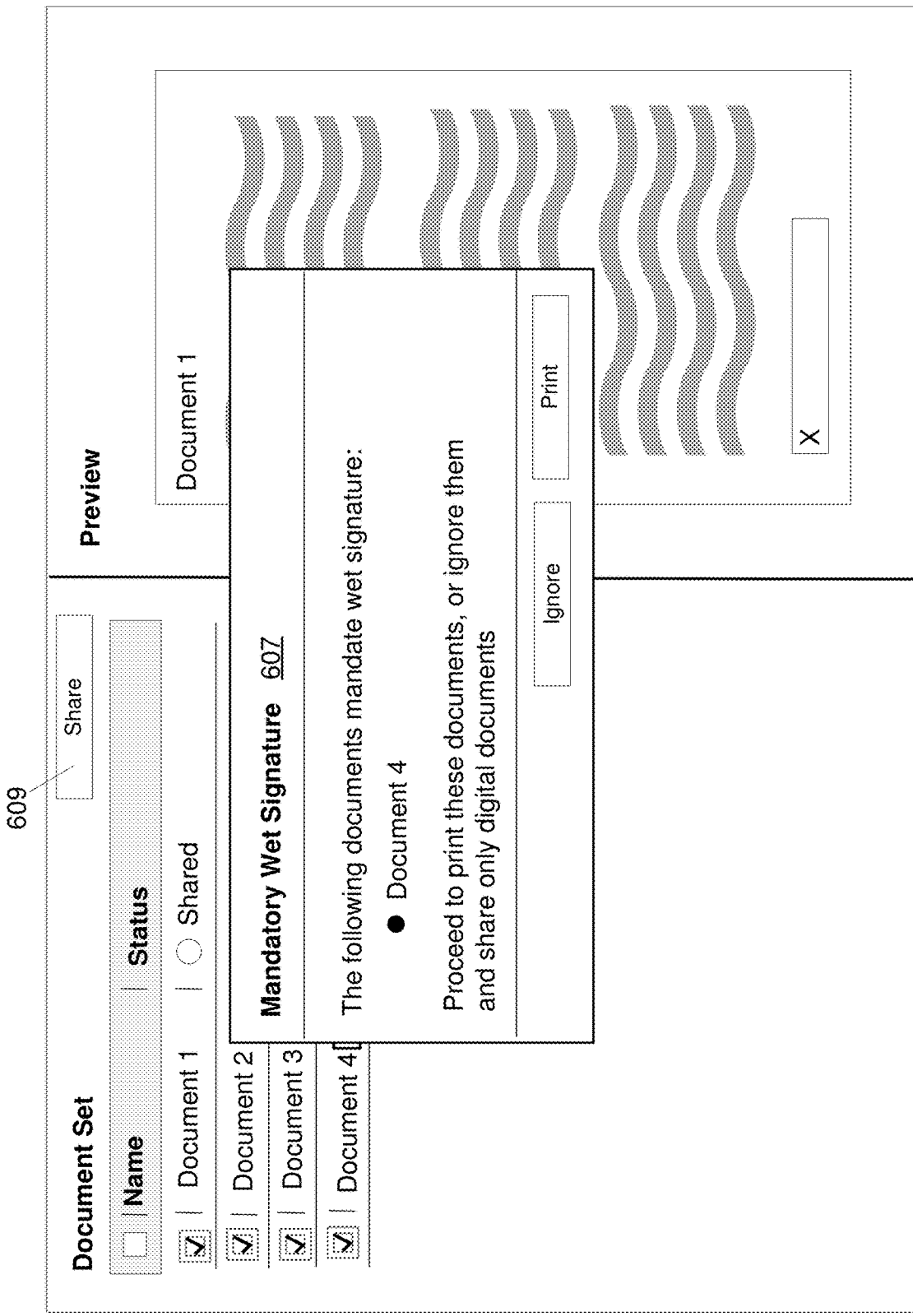

In one embodiment, the set of secondary documents also includes an exclusion identifier 605 of any secondary documents that require a wet signature (e.g., handwritten signature). The exclusion identifier 605 visually indicates that the secondary document should not be shared during an online sharing session for e-signing. The document module 213 includes an exclusion identifier for a secondary document in the list based on the stored exclusion policies indicating the secondary document should be excluded from online sharing. If the representative attempts to share a secondary document that requires a wet signature, the document module 213 generates a notification 607 as shown in FIG. 6B that notifies the representative that the secondary document(s) requires a wet signature and should not be shared for e-signing. The representative may either print the secondary document for wet signature or ignore the notification such that only documents eligible for e-signing during an online sharing session are transmitted.

The conversion module 207 may receive a request from the enterprise device 107 to share the set of secondary document with one or more other users. The request may be received from the conversion module 207 responsive to the representative selecting the "share" user interface element 609 as shown in FIGS. 6A and 6B, for example. The sharing request may include identifiers of users invited to the online sharing session and the date and time of the online sharing session.

The conversion module 207 generates sharing versions of the secondary documents from the set based on the previews of the secondary documents. The sharing versions of the secondary documents may be stored in the document database 201 for use during the online sharing session. In one embodiment, the conversion module 207 may generate the sharing versions of the secondary document for sharing responsive to the sharing request or may wait to generate the sharing versions of the secondary documents for sharing until the online sharing session. As mentioned previously, the conversion module 207 may convert the preview of the secondary document that is in the preview format (e.g., HTML) into the sharing format.

In one embodiment, the sharing module 209 shares the set of secondary documents that is in the sharing format with one or more participants during a scheduled online session. The sharing module 209 may transmit an invitation for the online sharing session to devices of the participants identified in the request attributes. Only participants who have the link will be authorized access to the online sharing session.

In one embodiment, if multiple parties are required to sign different subsets of secondary documents from the set, the sharing module 209 may provide the different subsets of secondary documents to the appropriate participant during the online sharing session. Thus, each participant may receive a different set of secondary documents during the online sharing session. For example, the set of secondary documents for a first participant may include a first plurality of secondary documents from the set and the set of secondary documents for a second participant may include a second plurality of secondary document from the set. The first plurality of secondary documents and the second plurality of secondary documents may have at least one common secondary document that requires a signature from both participants as well as at least one secondary document that requires a signature from only one of the participants. Thus, each participant of the online sharing session receives only secondary documents that require e-signing for that particular participant invited to the online sharing session. The participants required to sign the secondary documents may be non-representatives or a combination of representatives and non-representatives of the enterprise 101.

During the online sharing session, the actual secondary documents are shared during the online session rather than merely an image of the content displayed on a display screen of one of the participant's device. FIG. 7A illustrates one example of an online sharing session 700. As shown in FIG. 7A, the online sharing session 700 includes a list of the secondary documents 700 for e-signing during the online sharing session. The list includes the names of the secondary documents requiring e-signing as well as various attributes for each secondary document such as the date the secondary document was shared, the date of signature if signed, and an indication whether the document was signed.

During the online sharing session, the representative of the enterprise 101 may review the set of secondary documents with the participant(s) required to e-sign the secondary documents in one embodiment. If the existing content (e.g., values of the fields of information) of one of the secondary documents requires editing (e.g., addition, deletion, or modification), the participant may request for the representative to edit the secondary document during the online sharing session. Accordingly, the reception module 205 may receive edits to the version of the secondary document stored in the editing format. The conversion module 207 may convert the edited secondary document into the sharing format and the sharing module 209 may re-share the edited secondary document during the online sharing session according to the process previously described above. In other embodiments, the representative of the enterprise 101 may not collaboratively review the secondary documents with the participant(s) that is required to e-sign the secondary documents.

The sharing module 209 may receive a request from a client device 109 of a participant of the online sharing session to begin signing one or all of the secondary documents in the set. For example, sharing module 209 receives a request from a client device 109 of a non-representative of the enterprise 101 responsive to the non-representative selecting which of the secondary documents to sign followed by selecting the "start signing" user interface element 701 included in the online sharing session 700 as shown in FIG. 7A.

Figure 7B:
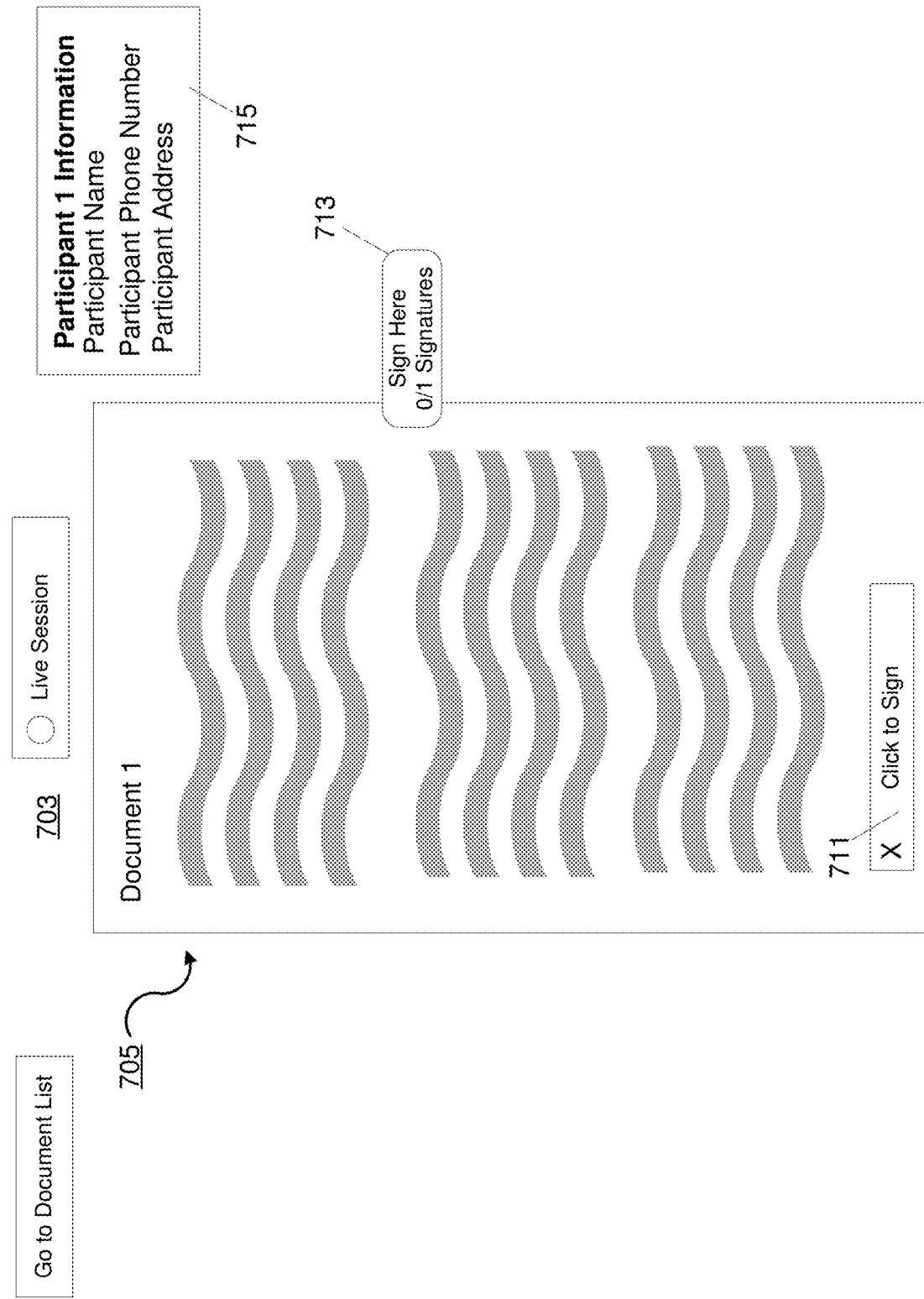

Responsive to the request to sign the secondary documents in the set, the sharing module 209 updates the online sharing session with one of the secondary documents from the set for e-signing. The secondary document may be the selected secondary document if only a single secondary document is selected for signing or may be the first secondary document from the selected secondary documents if multiple secondary documents are selected. FIG. 7B illustrates a document view 703 of the online sharing session that includes the secondary document 705 for e-signing.

Figure 7C:
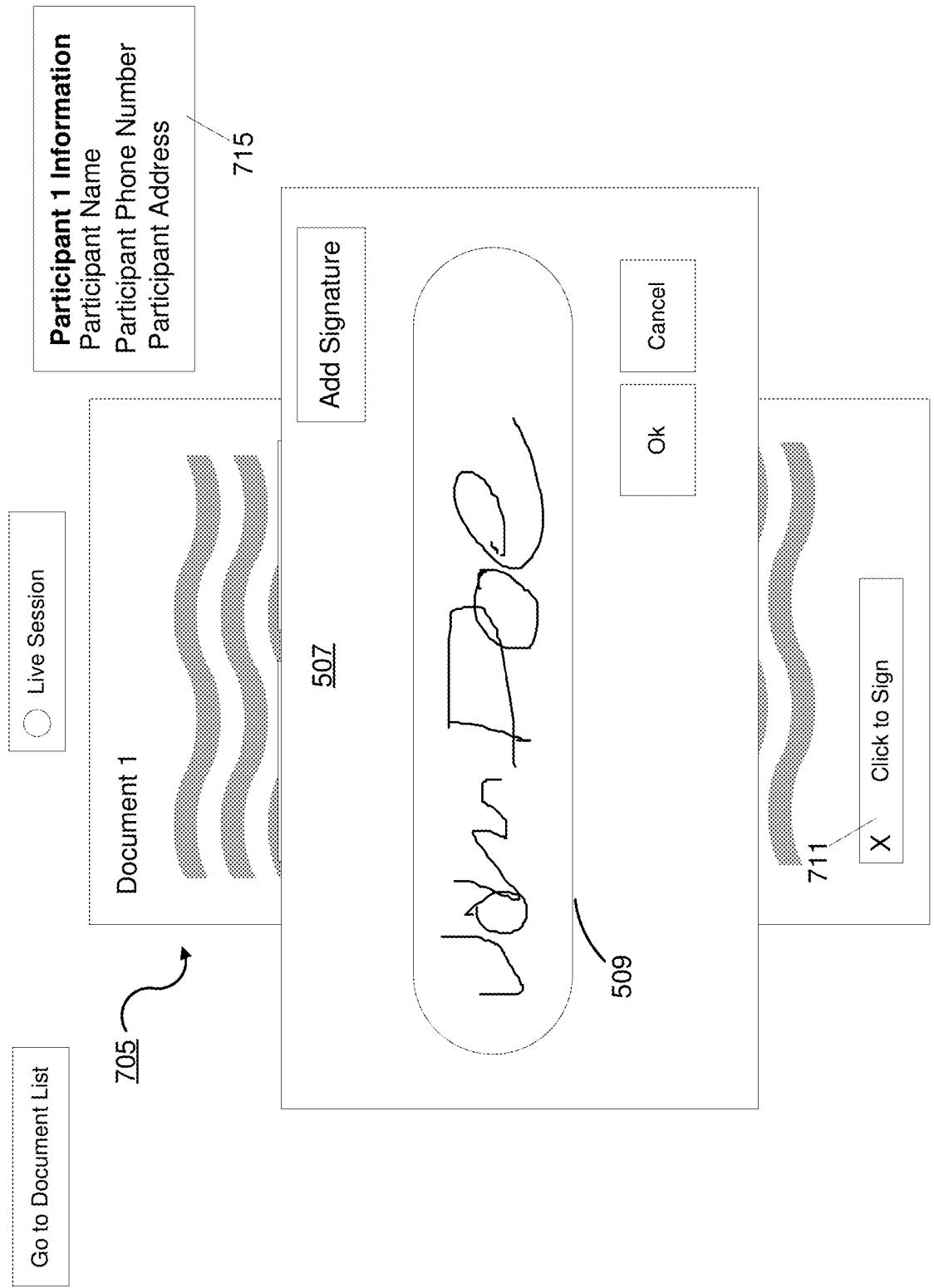
Figure 7D:
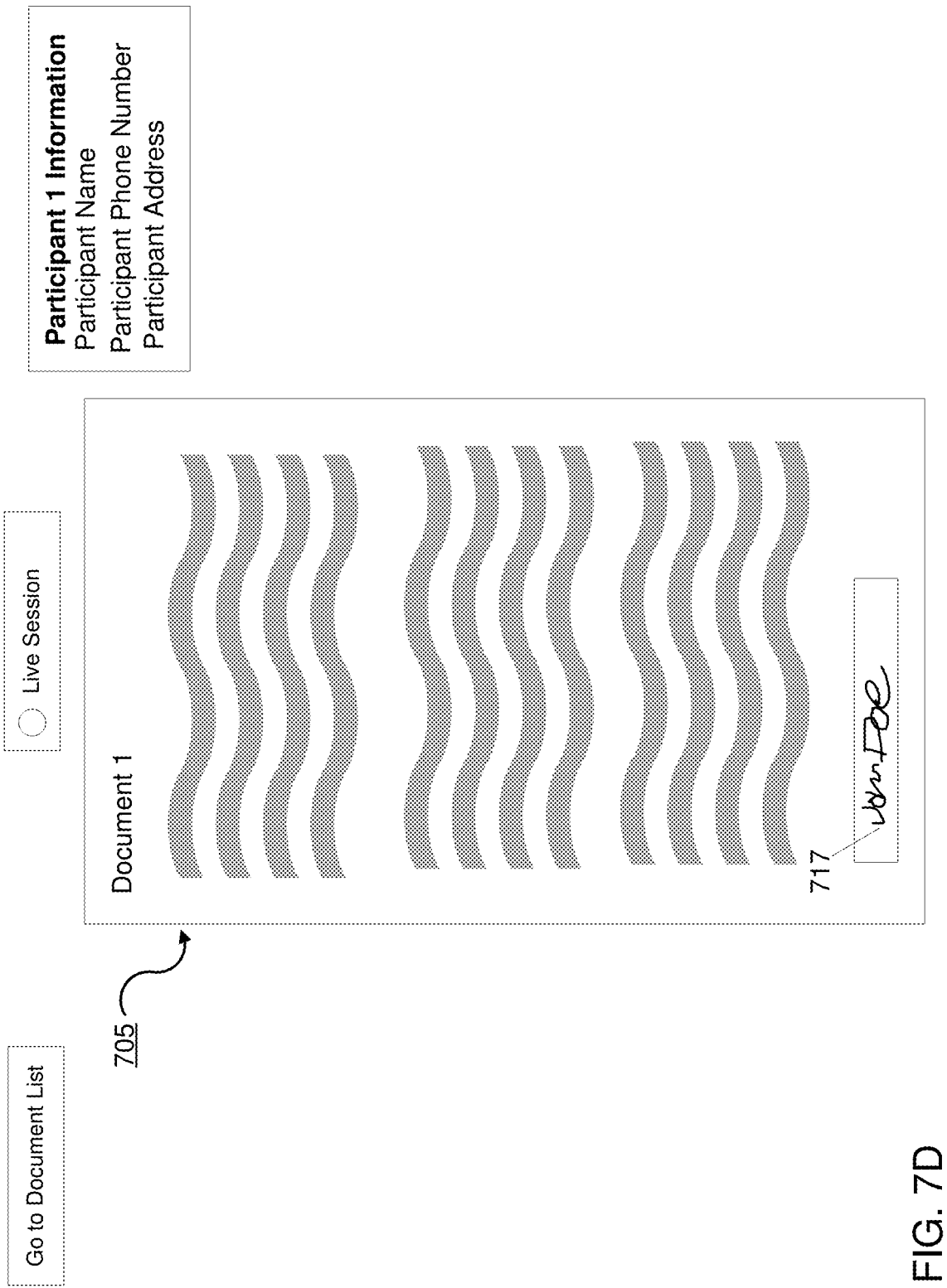

The signature module 211 transmits the electronic signature tool 507 to the device that requested to e-sign the secondary document as shown in FIG. 7C responsive to receiving a selection of the "click to sign" user interface element 711. The electronic signature tool 507 includes a signature location 509 where the participant adds his or her electronic signature as previously described. In one embodiment, the signature module 209 receives an electronic signature drawn by the participant in the signature location 509. Alternatively, the signature module 209 transmits different electronic signatures to the participant to select from. The electronic signature 717 is added to the secondary document as shown in FIG. 7D.

In one embodiment, a secondary document for e-signing may include two different signature portions that are interdependent. If one signature portion of the secondary document is signed, the document management system 103 disables the interdependent signature portion of the secondary document as both signature portions should not be signed.

Responsive to a secondary document being e-signed, the sharing module 211 stores the signed secondary document in the document database 201. Furthermore, the online sharing session is updated with the next secondary document for execution if multiple secondary documents are selected for e-signing or the online sharing session is updated to redisplay the list of secondary documents 700 as shown in FIG. 7E. In FIG. 7E, the list of secondary documents is updated to include the date Document 1 was signed. The participant of the online sharing session repeats the signing process until all of the secondary documents in the list are e-signed.

In one embodiment, a third-party secondary document included in the shared set of secondary documents must be signed at the third-party document source 111. An example of a third-party secondary document that must be signed at the third-party document source 111 is a LAW 533 document. Thus, the third-party secondary document cannot be executed in the online sharing session. In one embodiment, the document module 213 retrieves the third-party secondary document from the third-party document source 111 and the third-party secondary document is displayed during the online sharing session. However, the actual signing of the third-party secondary document does not occur in the online sharing session.

In one embodiment, the signature module 211 receives the electronic signature from the client device 109 of the participant, as previously described above. However, the signature module 211 does not apply the electronic signature to the third-party secondary document in the online sharing session. Rather, the signature module 211 transmits the electronic signature to the third party document source 111. Values required to complete the third-party secondary document may also be transmitted to the third party document source 111. The third party document source 111 applies the electronic signature to the third-party secondary document. The third party document source 111 may also apply any values to complete the third-party secondary document. The third party document source 111 transmits the e-signed third-party secondary document to the document management system 103 for storage. Although it appears to the participant of the online sharing session that the third-party secondary document is signed in the online sharing session, the e-signing process occurs outside of the online sharing session at the third-party document source 111. Thus, the participant is not burdened from having a separate online sharing session with the third party document source 111 to e-sign the third-party secondary document.

Process for E-Signing a Document Set

Figure 8:
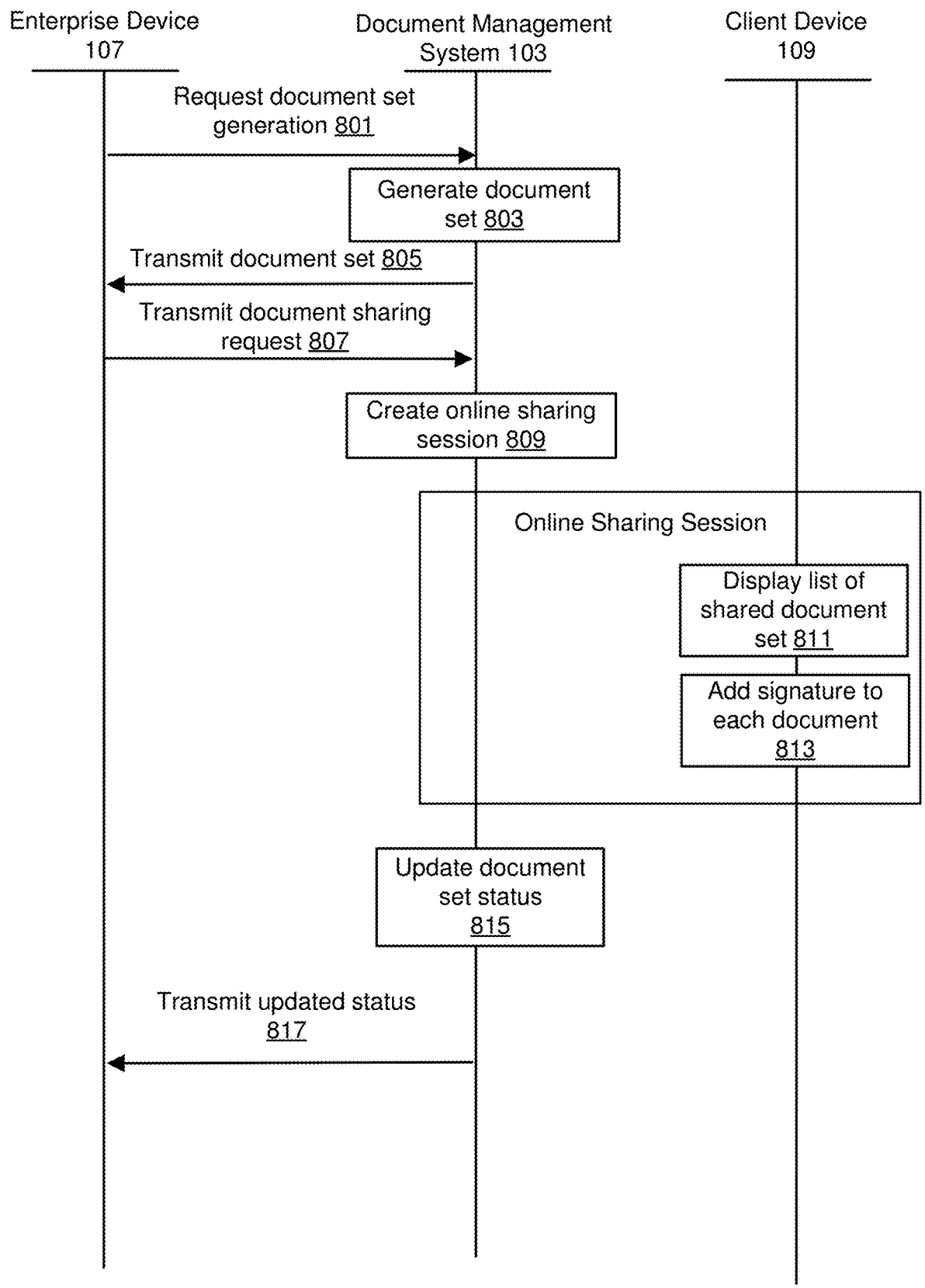
FIG. 8 is an interaction diagram illustrating a process of e-signing a document during an online sharing session according to one embodiment.

FIG. 8 is an interaction diagram illustrating a process for e-signing a secondary document set during an online sharing session according to one embodiment. In the example shown in FIG. 8, a secondary document set is shared between a representative of the enterprise using enterprise device 107 and a non-representative of the enterprise using client device 109. However, in other embodiments a secondary document set may be shared with any type of participant and any number of participants. Furthermore, the process for e-signing a secondary document set may include other steps than shown in FIG. 8.

The enterprise device 107 transmits 801 a request to the document management system 103 to generate a secondary document set. The secondary document set includes a plurality of secondary documents. In one embodiment, the secondary document set is associated with a primary document e-signed by a user of client device 109. The document management system 103 generates 803 the secondary document set based on the request. Values for fields of information in the secondary documents in the set may be received from the enterprise device 107 or automatically populated by the document management system 103.

The document management system 103 transmits 805 the secondary document set to the enterprise device 107 for review. Upon approval of the secondary document set, the enterprise device 107 transmits 807 a document sharing request to the document management system 103. The document sharing request indicates one or more participants invited to view the shared secondary document during an online sharing session for e-signing.

The document management system 103 creates 809 an online sharing session that includes the secondary document set for e-signing. In the embodiment shown in FIG. 8A, only the client device 109 participants in the online sharing session of the secondary document set. During the online sharing session, the enterprise device 107 displays 811 a list of the secondary document set 811. The list indicates the secondary documents that require e-signing during the online sharing session. The client device 109 iteratively selects each secondary document from the list for review and adds 813 the participant's electronic signature to each secondary document upon approval of each secondary document.

As mentioned above, for third-party secondary documents that require execution at the third-party document source 111, the document management system 103 transmits the electronic signature and the values for the third-party secondary document to the third party-document source 111. The third-party document source 111 signs the third-party secondary document and transmits the signed third-party document to the document management system 103.

After all the documents in the list are e-signed by the participant, the online sharing session is ended. The document management system 103 updates the document set status to indicate all the secondary documents were e-signed. The document management system 103 transmits 817 an updated status to the enterprise device 107 notifying the representative that all of the secondary documents in the secondary document set are signed.

Figure 9:
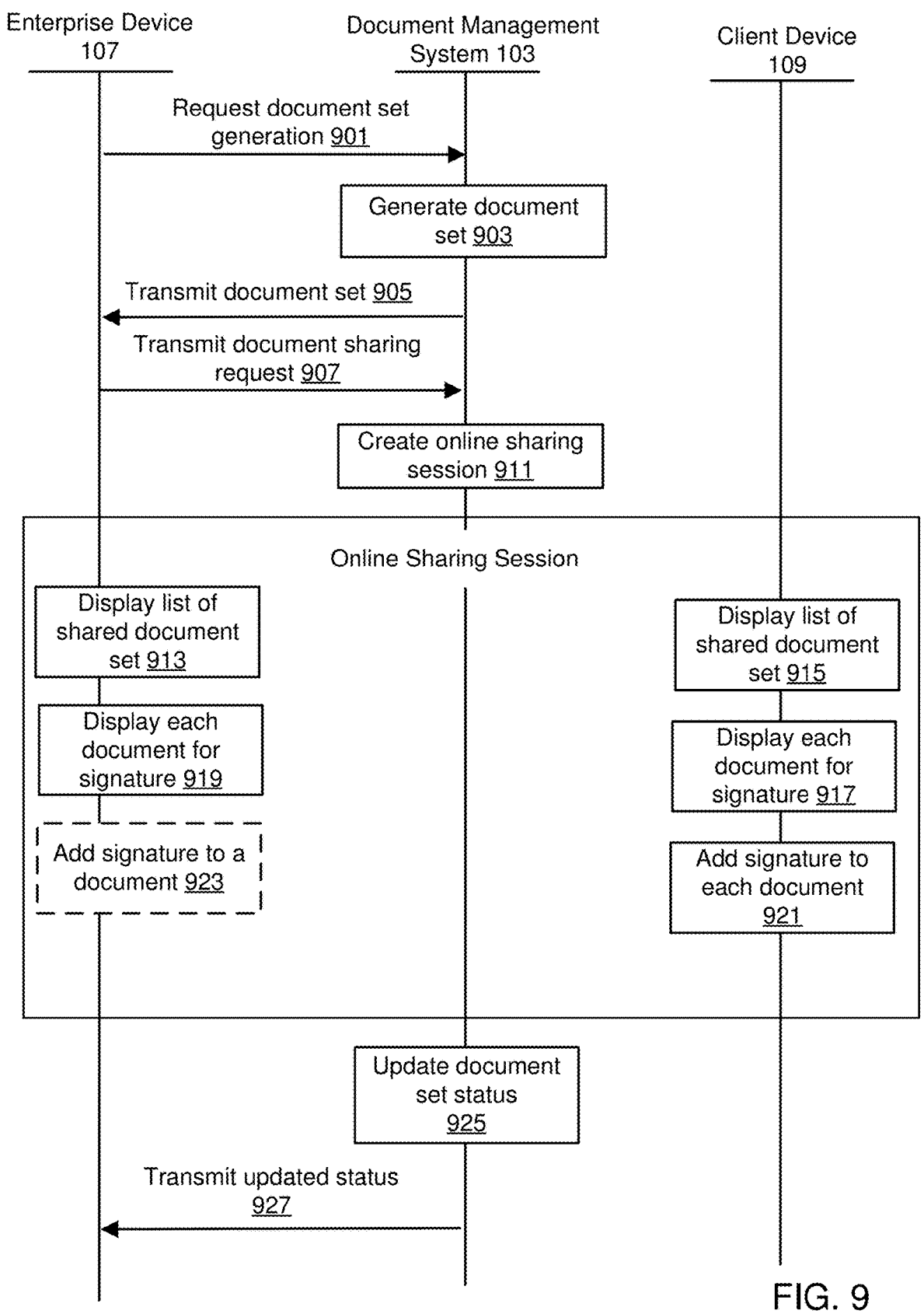
FIG. 9 is an interaction diagram illustrating a process of e-signing a document during an online sharing session according to another embodiment.

FIG. 9 is an interaction diagram illustrating a process for e-signing a secondary document set during an online sharing session according to another embodiment. In the example shown in FIG. 9, a secondary document set is shared between a representative of the enterprise using enterprise device 107 and a non-representative of the enterprise using client device 109 and both the representative and non-representative participate during an online sharing session. The process for e-signing sharing a document may include other steps than shown in FIG. 8B.

The enterprise device 107 transmits 901 a request to the document management system 103 to generate a secondary document set. The secondary document set includes a plurality of secondary documents. In one embodiment, the secondary document set is associated with a primary document e-signed by a user of client device 109. The document management system 103 generates 903 the secondary document set based on the request. Values for fields of information in the secondary documents in the set may be received from the enterprise device 107 or automatically populated by the document management system 103.

The document management system 103 transmits 905 the secondary document set to the enterprise device 107 for review. Upon approval of the secondary document set, the enterprise device 107 transmits 907 a document sharing request to the document management system 103. The document sharing request indicates one or more participants invited to view the secondary document set during an online sharing session for e-signing.

The document management system 103 creates 911 an online sharing session that includes the secondary document set for e-signing. In the embodiment shown in FIG. 9, both the representative of the enterprise 101 and the non-representative participate in the online sharing session of the secondary document set. During the online sharing session, the representative and the non-representative collaboratively review the secondary document set prior to the non-representative e-signing the documents in the document set.

During the online sharing session, the enterprise device 107 displays 913 the list of shared document set and the client device 109 displays 915 the list of the shared document set. By displaying the list to both the representative and non-representative, the documents can be collaboratively reviewed during the online sharing session. That is, the enterprise device 107 displays 919 each secondary document for signature from the list and the client device 109 also displays each secondary document for signature from the list. The representative may explain each secondary document to the non-representative during the online sharing session. The client device 109 adds 921 the electronic signature of the non-representative to each secondary document during the online sharing session upon approval of each secondary document. In one embodiment, the representative may be required to sign one or more secondary documents. Accordingly, the enterprise device 107 adds 923 an electronic signature of the representative to the one more secondary documents.

As mentioned above, for third-party secondary documents that require execution at the third-party document source 111, the document management system 103 transmits the electronic signature and the values for the third-party secondary document to the third party-document source 111. The third-party document source 111 signs the third-party secondary document and transmits the signed third-party secondary document to the document management system 103.

After all the secondary documents in the list are e-signed by the participant, the online sharing session is ended. The document management system 103 updates 925 the secondary document set status to indicate all the secondary documents were e-signed. The document management system 103 transmits 925 an updated status to the enterprise device 107 notifying the representative that all of the secondary documents in the document set are signed.

Alternate Document Management System Environment

FIG. 10 is a high-level block diagram illustrating an alternate embodiment of an environment 900 of a document management system for e-signing documents of an enterprise 1001. The environment 1000 is similar to the environment 100 shown in FIG. 1. The environment 1000 includes an enterprise 1001, a document management system 1003, enterprise devices 107, client devices 109, and third-party document source 111. The entities in environment 1000 perform similar functions as their counterparts in environment 100 shown in FIG. 1 thus the description is omitted for readability.

However, in environment 1000 the document management system 1003 is separated from enterprise 1001. In the example of FIG. 10, a separate entity may be responsible for operating the document management system 1003 that manages documents on behalf of the enterprise 1001. Alternatively, the same entity may be responsible for both the enterprise 1001 and the document management system 1003, but the document management system 1003 is separated from the enterprise 1001.

Hardware Components

Figure 11:
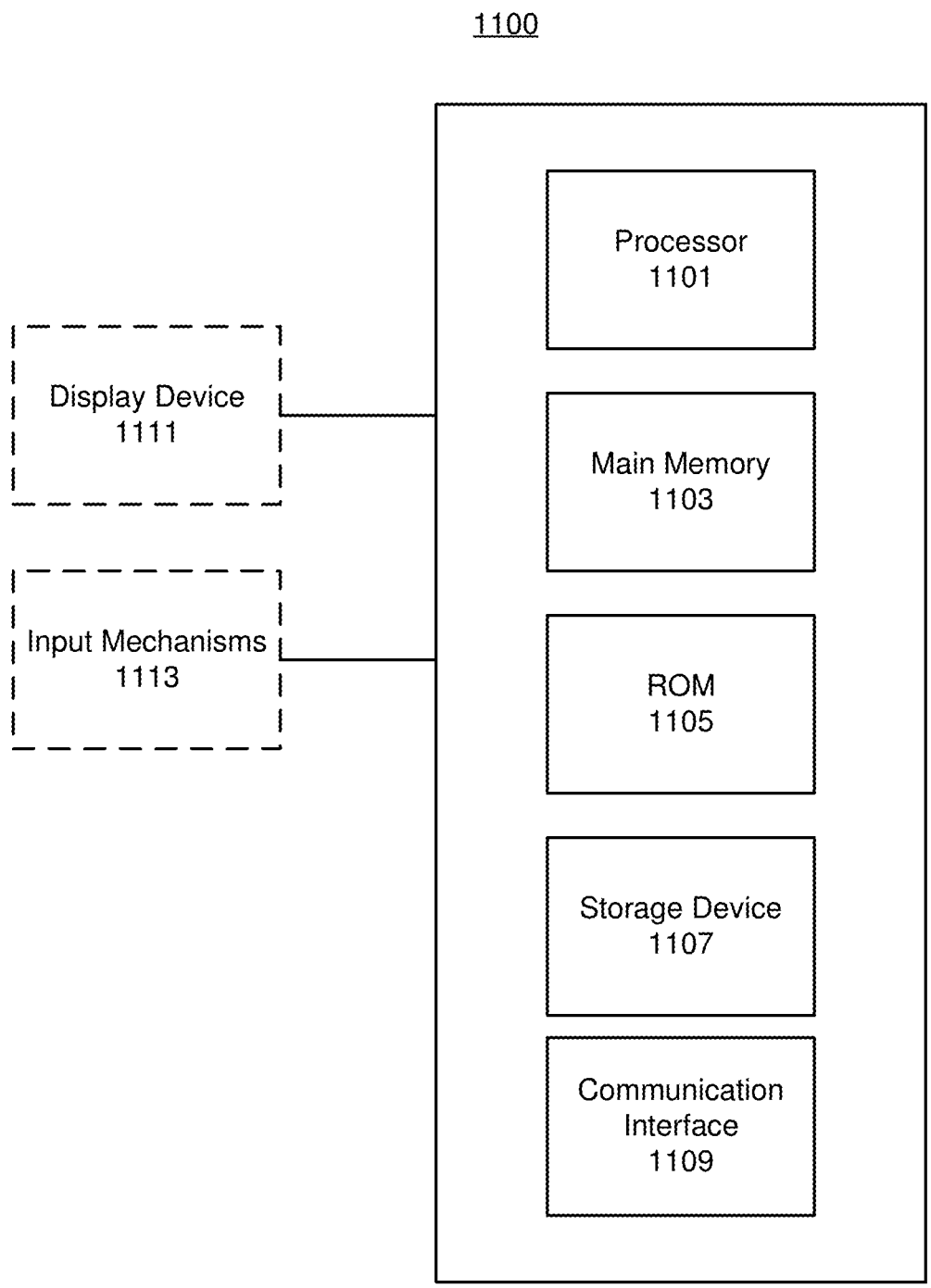
FIG. 11 is system diagram of a computer system, according to one embodiment.

FIG. 11 is a diagram illustrating a computer system 1100 upon which embodiments described herein may be implemented within the document management system 103/1003, enterprise devices 107, client devices 109, and third-party document source 111. For example, the document management system 103/1003, enterprise devices 107, client devices 109, and third-party document source 111 may each be implemented using a computer system such as described by FIG. 11. The document management system 103/1003 may also be implemented using a combination of multiple computer systems as described by FIG. 11.

In one implementation, the document management system 103/1003, enterprise devices 107, client devices 109, and third-party document source each include processing resources 1101, main memory 1103, read only memory (ROM) 1105, storage device 1107, and a communication interface 1109. The document management system 103/1003, enterprise devices 107, client devices 109, and third-party document source 111 each include at least one processor 1101 for processing information and a main memory 1103, such as a random access memory (RAM) or other dynamic storage device, for storing information and instructions to be executed by the processor 1001. In one embodiment, multiple processors are employed by the document management system 103/1003 to perform the techniques described above in order to improve efficiency of the document management system 103/1003 and reduce computation time when sharing documents for e-signing. Main memory 1103 also may be used for storing temporary variables or other intermediate information during execution of instructions to be executed by processor 1101. The document management system 103/1003, enterprise devices 107, client devices 109, and third-party document source 111 may each also include ROM 1105 or other static storage device for storing static information and instructions for processor 1101. The storage device 1107, such as a magnetic disk or optical disk or solid state memory device, is provided for storing information and instructions.

The communication interface 1109 can enable each of document management system 103/1003, enterprise devices 107, client devices 109, and third-party document source 111 to communicate with each other through use of a communication link (wireless or wireline). Each of document management system 103/1003, enterprise devices 107, client devices 109, and third-party document source 111 can optionally include a display device 1111, such as a cathode ray tube (CRT), an LCD monitor, an LED monitor, OLED monitor, a TFT display or a television set, for example, for displaying graphics and information to a user. An input mechanism 1113, such as a keyboard that includes alphanumeric keys and other keys, can optionally be coupled to the computer system 1100 for communicating information and command selections to processor 1101. Other non-limiting, illustrative examples of input mechanisms 1113 include a mouse, a trackball, touch-sensitive screen, or cursor direction keys for communicating direction information and command selections to processor 1001 and for controlling cursor movement on display device 1111.

Examples described herein are related to the use of the document management system 103/1003, enterprise devices 107, client devices 109, and third-party document source 111 for implementing the techniques described herein. According to one embodiment, those techniques are performed by each of the document management system 103/1003, enterprise devices 107, client devices 109, and third-party document source 111 in response to processor 1101 executing one or more sequences of one or more instructions contained in main memory 1103. Such instructions may be read into main memory 1103 from another machine-readable medium, such as storage device 1107. Execution of the sequences of instructions contained in main memory 1103 causes processor 1101 to perform the process steps described herein. In alternative implementations, hard-wired circuitry may be used in place of or in combination with software instructions to implement examples described herein. Thus, the examples described are not limited to any specific combination of hardware circuitry and software. Furthermore, it has also proven convenient at times, to refer to arrangements of operations as modules, without loss of generality. The described operations and their associated modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method of a document management system for sharing documents for electronic signature during an online sharing session, the computer-implemented method comprising:

determining, by the document management system, a set of second documents that are associated with a first document;

determining, by the document management system, one or more second documents from the set of second documents that require a handwritten signature based on an exclusion policy that excludes the one or more second documents from being electronically signed, the exclusion policy including a type of printer required to print the one or more second documents and the type of printer indicative that the one or more second documents requires the handwritten signature;

receiving, by the document management system, a request from a first device of a first user to share the set of second documents with at least a second user that electronically signed the first document, the set of second documents including a plurality of second documents requiring an electronic signature of the second user;

transmitting, by the document management system, an invitation for an online sharing session to the first device of the first user and a second device of the second user, the invitation including authentication information for the online sharing session;

establishing, by the document management system, the online sharing session with the first device of the first user and the second device of the second user responsive to receiving the authentication information from the first device and the second device, the online sharing session including the set of second documents but excludes the determined one or more second document such that the first user reviews the set of second documents with the second user during the online sharing session via the first device and the second device that each display the set of second documents;

while the second document is displayed on the first device and the second device during the online sharing session, receiving, by the document management system, a request from the second device of the second user for the first user to revise a second document from the set of second documents that is being reviewed by the first user and the second user during the online sharing session;

receiving, by the document management system, a revision to a stored version of the second document that is being reviewed by the first user and the second user during the online sharing session from the first device of the first user responsive to the request from the second device of the second user for the first user to revise the second document;

updating, by the document management system, the online sharing session such that the updated online sharing session includes a revised second document that is reviewed by the first user and the second user during the online sharing session, the revised second document including the revision received from the first device of the first user;

receiving, by the document management system, the electronic signature of the second user for each of the plurality of second documents including the revised second document during the online sharing session such that the first user views the electronic signature of the second user for each of the plurality of second documents during the online sharing session with the second user; and transmitting a notification to the first device of the first user that the set of second documents are electronically signed by the second user.

2. The computer-implemented method of claim 1, further comprising:
receiving, by the document management system, an electronic signature of the first user for at least one of the second documents in the set from the first device of the first user during the online sharing session, wherein the at least one of the second documents includes the electronic signature of the first user and the electronic signature of the second user.

3. The computer-implemented method of claim 1, wherein the received request is to share the set of second documents with the second user and a third user, the computer-implemented method further comprising:
determining a subset of the set of second documents that require an electronic signature from the third user, the subset of the set of second documents including at least one of a second document requiring the electronic signature of the third user but not the electronic signature of second user or a second document requiring the electronic signature of the third user and the electronic signature of the second user.

4. The computer-implemented method of claim 3, wherein establishing the online sharing session comprises:
providing the set of second documents to the first device of the first user and the second device of the second user and the determined subset of the set of second documents to a third device of the third user during the online sharing session,
wherein the set of second documents includes at least one second document that is not included in the subset of the set of second documents.

5. The computer-implemented method of claim 1, wherein the set of second documents includes a third-party document from a third-party document source, the method further comprising:
receiving, by the document management system, a request from the second device of the second user during the online sharing session to display the third-party document;
transmitting, by the document management system, a request to the third-party document source during the online sharing session for the third-party document; and
providing the third-party document to at least the second device of the second user during the online sharing session responsive to receiving the third-party document from the third-party document source.

6. The computer-implemented method of claim 5, wherein receiving the electronic signature comprises:
receiving, by the document management system, the electronic signature of the second user for the third-party document during the online sharing session;
transmitting the electronic signature of the second user to the third-party document source; and
receiving, by the document management system, the third-party document electronically signed with the electronic signature of the second user from the third-party document source, wherein the electronic signature of the second user is applied to the third-party document at the third-party document source.

7. The computer-implemented method of claim 1, wherein the request from the second device of the second user is for the first user to revise a value of one of a plurality of fields of the second document,
wherein the revision to the stored version of the second document received from the first device of the first user includes a revision to the value.

8. A non-transitory computer-readable storage medium storing executable computer program instructions for sharing documents for electronic signature during an online sharing session, the instructions when executed by one or more computer processors cause the one or more computer processors to perform steps comprising:
determining, by a document management system, a set of second documents that are associated with a first document;
determining, by the document management system, one or more second documents from the set of second documents that require a handwritten signature based on an exclusion policy that excludes the one or more second documents from being electronically signed, the exclusion policy including a type of printer required to print the one or more second documents and the type of printer indicative that the one or more second documents requires the handwritten signature;
receiving, by the document management system, a request from a first device of a first user to share the set of second documents with at least a second user that electronically signed the first document, the set of second documents including a plurality of second documents requiring an electronic signature of the second user;
transmitting, by the document management system, an invitation for an online sharing session to the first device of the first user and a second device of the second user, the invitation including authentication information for the online sharing session;

establishing, by the document management system, the online sharing session with the first device of the first user and the second device of the second user responsive to receiving the authentication information from the first device and the second device, the online sharing session including the set of second documents but excludes the determined one or more second document such that the first user reviews the set of second documents with the second user during the online sharing session via the first device and the second device that each display the set of second documents;

while the second document is displayed on the first device and the second device during the online sharing session, receiving, by the document management system, a request from the second device of the second user for the first user to revise a second document from the set of second documents that is being reviewed by the first user and the second user during the online sharing session;

receiving, by the document management system, a revision to a stored version of the second document that is being reviewed by the first user and the second user during the online sharing session from the first device of the first user responsive to the request from the second device of the second user for the first user to revise the second document;

updating, by the document management system, the online sharing session such that the updated online sharing session includes a revised second document that is reviewed by the first user and the second user during the online sharing session, the revised second document including the revision received from the first device of the first user;

receiving, by the document management system, the electronic signature of the second user for each of the plurality of second documents including the revised second document during the online sharing session such that the first user views the electronic signature of the second user for each of the plurality of second documents during the online sharing session with the second user; and transmitting a notification to the first device of the first user that the set of second documents are electronically signed by the second user.

9. The non-transitory computer-readable storage medium of claim 8, wherein the instructions further cause the one or more computer processors to perform steps comprising:

receiving, by the document management system, an electronic signature of the first user for at least one of the second documents in the set from the first device of the first user during the online sharing session, wherein the at least one of the second documents includes the electronic signature of the first user and the electronic signature of the second user.

10. The non-transitory computer-readable storage medium of claim 8, wherein the received request is to share the set of second documents with the second user and a third user, and the instructions further cause the one or more computer processors to perform steps comprising:

determining a subset of the set of second documents that require an electronic signature from the third user, the subset of the set of second documents including at least one of a second document requiring the electronic signature of the third user but not the electronic signature of second user or a second document requiring the electronic signature of the third user and the electronic signature of the second user.

11. The non-transitory computer-readable storage medium of claim 10, wherein establishing the online sharing session comprises:

providing the set of second documents to the first device of the first user and the second device of the second user and the determined subset of the set of second documents to a third device of the third user during the online sharing session, wherein the set of second documents includes at least one second document that is not included in the subset of the set of second documents.

12. The non-transitory computer-readable storage medium of claim 8, wherein the set of second documents includes a third-party document from a third-party document source, and wherein the instructions further cause the one or more computer processors to perform steps comprising:

receiving, by the document management system, a request from the second device of the second user during the online sharing session to display the third-party document;

transmitting, by the document management system, a request to the third-party document source during the online sharing session for the third-party document; and providing the third-party document to at least the second device of the second user during the online sharing session responsive to receiving the third-party document from the third-party document source.

13. The non-transitory computer-readable storage medium of claim 12, wherein receiving the electronic signature comprises:

receiving, by the document management system, the electronic signature of the second user for the third-party document during the online sharing session;

transmitting the electronic signature of the second user to the third-party document source; and receiving, by the document management system, the third-party document electronically signed with the electronic signature of the second user from the third-party document source, wherein the electronic signature of the second user is applied to the third-party document at the third-party document source.

14. A document management system for sharing documents for electronic signature during an online sharing session, the document management system comprising:

one or more computer processors; and a non-transitory computer-readable storage medium storing executable computer program instructions, the instructions when executed by the one or more computer processors cause the one or more computer processors to perform steps comprising:

determining, by the document management system, a set of second documents that are associated with a first document;

determining, by the document management system, one or more second documents from the set of second documents that require a handwritten signature based on an exclusion policy that excludes the one or more second documents from being electronically signed, the exclusion policy including a type of printer required to print the one or more second documents and the type of printer indicative that the one or more second documents requires the handwritten signature;

receiving, by the document management system, a request from a first device of a first user to share the set of second documents with at least a second user that electronically signed the first document, the set of second documents including a plurality of second documents requiring an electronic signature of the second user;

transmitting, by the document management system, an invitation for an online sharing session to the first device of the first user and a second device of the second user, the invitation including authentication information for the online sharing session;

establishing, by the document management system, the online sharing session with the first device of the first user and the second device of the second user responsive to receiving the authentication information from the first device and the second device, the online sharing session including the set of second documents but excludes the determined one or more second document such that the first user reviews the set of second documents with the second user during the online sharing session via the first device and the second device that each display the set of second documents;

while the second document is displayed on the first device and the second device during the online sharing session, receiving, by the document management system, a request from the second device of the second user for the first user to revise a second document from the set of second documents that is being reviewed by the first user and the second user during the online sharing session;

receiving, by the document management system, a revision to a stored version of the second document that is being reviewed by the first user and the second user during the online sharing session from the first device of the first user responsive to the request from the second device of the second user for the first user to revise the second document;

updating, by the document management system, the online sharing session such that the updated online sharing session includes a revised second document that is reviewed by the first user and the second user during the online sharing session, the revised second document including the revision received from the first device of the first user;

receiving, by the document management system, the electronic signature of the second user for each of the plurality of second documents including the revised second document during the online sharing session such that the first user views the electronic signature of the second user for each of the plurality of second documents during the online sharing session with the second user; and transmitting a notification to the first device of the first user that the set of second documents are electronically signed by the second user.

15. The document management system of claim 14, wherein the received request is to share the set of second documents with the second user and a third user, and the instructions further cause the one or more computer processors to perform steps comprising:

determining a subset of the set of second documents that require an electronic signature from the third user, the subset of the set of second documents including at least one of a second document requiring the electronic signature of the third user but not the electronic signature of second user or a second document requiring the electronic signature of the third user and the electronic signature of the second user.

\* \* \* \* \*